(12) United States Patent
Ulrich (10) Patent No.: US 6,313,856 B1
(45) Date of Patent: Nov. 6, 2001

(54) DEVICE FOR THERMAL APPLICATION OF INFORMATION AND INFORMATION CARRIER

(75) Inventor: Ewald Ulrich, Gleisdorf (AT)

(73) Assignee: Ulrich Electronic GmbH, Gleisdorf (AT)

( * ) Notice: Subject to any disclaimer, the term of this patent is extended or adjusted under 35 U.S.C. 154(b) by 0 days.

(21) Appl. No.: 09/319,130

(22) PCT Filed: Dec. 2, 1997

(86) PCT No.: PCT/AT97/00261

§ 371 Date: Jul. 23, 1999

§ 102(e) Date: Jul. 23, 1999

(87) PCT Pub. No.: WO98/24632

PCT Pub. Date: Jun. 11, 1998

(30) Foreign Application Priority Data

Dec. 2, 1996 (AT) .................................................. 2085/96

(51) Int. Cl.[7] ........................................................ B41J 2/32

(52) U.S. Cl. ................................................................ 347/171

(58) Field of Search .................................... 347/171, 185; 219/121; 235/494, 486; 400/662, 120.01

(56) References Cited

U.S. PATENT DOCUMENTS

| | | | |
|---|---|---|---|
| 5,019,769 | 5/1991 | Levinson | 372/31 |
| 5,089,694 | * 2/1992 | Zerfahs et al. | 235/486 |
| 5,168,491 | 12/1992 | Akatsuka | 369/116 |
| 5,371,522 | 12/1994 | Miyawaki | 347/324 |
| 5,383,175 | 1/1995 | Finkelstein | 369/121 |
| 5,430,467 | 7/1995 | Yamaguchi | 347/171 |
| 5,453,765 | 9/1995 | Yamaguchi | 347/179 |
| 5,759,428 | * 6/1998 | Balamane et al. | 219/121 |
| 5,837,991 | * 11/1998 | LaManna et al. | 235/375 |
| 5,988,513 | * 11/1999 | Dean et al. | 235/494 |

FOREIGN PATENT DOCUMENTS

| | | |
|---|---|---|
| 43 39 216 | 4/1994 | (DE) . |
| 42 43 851 | 6/1994 | (DE) . |
| 197 05 009 | 10/1997 | (DE) . |
| 0 344 789 | 12/1989 | (EP) . |
| 0 431 155 | 6/1991 | (EP) . |
| 0 473 403 | 3/1992 | (EP) . |
| 0 557 013 | 8/1993 | (EP) . |
| 0 606 886 | 7/1994 | (EP) . |
| 0 729 848 | 9/1996 | (EP) . |
| 2717938 | 9/1995 | (FR) . |
| 2743440 | 7/1997 | (FR) . |
| 2273375 | 6/1994 | (GB) . |
| WO92/21105 | 11/1992 | (WO) . |
| WO96/31839 | 10/1996 | (WO) . |

OTHER PUBLICATIONS

Patent Abstract of Japan, JP 03 269693 (12/91), vol. 016, No. 085 (P–1319), Feb. 28, 1992.

Patent Abstract of Japan, JP 08 147432 (6/96), vol. 096, No. 010, Oct. 31, 1996.

(List continued on next page.)

Primary Examiner—N. Le
Assistant Examiner—K. Feggins
(74) Attorney, Agent, or Firm—Collard & Roe, P.C.

(57) ABSTRACT

The invention relates to a device (2) for thermal application of information, e.g. characters, graphics, etc., to a heat-sensitive layer (3) (foil) of an information carrier (4), preferably fitted with a data storage element (31) and/or a barcode, e.g., an ID card, a smart card, an access card or a merchandise labelling card etc., having an input and output device for the information carrier (4) and a deleting and/or printing device (22). To improve operation, the deleting and/or printing device (22) is provided with an upstream performance control circuit, and information is processed and transmitted to the deleting and/or printing device (22) by a processor.

38 Claims, 7 Drawing Sheets

OTHER PUBLICATIONS

Patent Abstract of Japan, JP 07 179060 (7/95), vol. 095, No. 010, Nov. 30, 1995.

Patent Abstract of Japan, JP 05 139028 (6/93), vol. 017, No. 524 (M–1483), Sep. 21, 1993.

Patent Abstract of Japan, JP 05 254282 (10/93), vol. 018, No. 013 (M–1539), Jan. 11, 1994.

Patent Abstract of Japan, JP 04 197656 (2/90), vol. 016, No. 529 (M–1332), Oct. 29, 1992.

Patent Abstract of Japan, JP 02 050897 (2/90), vol. 014, No. 217 (M–0970), May 8, 1990.

Patent Abstract of Japan, JP 07 276814 (10/95), vol. 096, No. 002, Feb. 29, 1996.

Patent Abstract of Japan, JP 08 039838 (2/96), vol. 096, No. 006, Jun. 28, 1996.

Patent Abstract of Japan, JP 62 267788 (11/87), vol. 012, No. 151 (P–699), May 11, 1988.

Patent Abstract of Japan, JP 63 254478 (10/88), vol. 013, No. 066 (P–828), Feb. 15, 1989.

Patent Abstract of Japan, JP 08 287211 (11/96), vol. 097, No. 003, Mar. 31, 1997.

Patent Abstract of Japan, JP 04 219271 (8/92), vol. 016, No. 569 (M–1343), Dec. 9, 1992.

* cited by examiner

DEVICE FOR THERMAL APPLICATION OF INFORMATION AND INFORMATION CARRIER

The invention relates to a device for the thermal application of information, e.g. characters, graphics, etc., to a heat-sensitive layer (foil) of an information carrier, preferably provided with an electronic data storage element in the form of a processor chip, e.g. ID card, smart card, access card or merchandise labelling card etc., with an input and output device for the information carrier formed by guides and with a deleting and/or printing device, which is arranged downstream of an energy control circuit for providing energy.

EP 0 431 155 B1 discloses a device for applying information onto an optical information carrier comprising a plastic card with a heat-sensitive film applied thereon, which has a deleting device, a pre-heating device, a writing device and a cooling device. In order to change plain text information on the heat-sensitive layer of the recording substrate, which can be erasably printed, the latter is fed to each of these function stations one after the other by a transport device and existing information is then changed to new, prespecified information. These changes are made in sequential steps and, in order to ensure the greatest security possible, time cycles must be short giving rise to a high throughput when amending plain text information on recording substrates of this type, which is very difficult to achieve. In addition, a recording substrate of this type is specifically suited only to the automated transfer of the information on the cards.

In EP 0 473 303 A2 a recording device for recording information onto a heat-sensitive layer of a recording carrier, in particular a magnetic card, is described. The magnetic strip of the recording carrier is in this case processable by a magnetic read and write head, which is conductively connected with a read or write control device. The read or wrote control device is in addition connected to a central control device which processes the data of the magnetic strip transmitted via the read or write control device. After data processing by the central control device the current data is sent to the read or write control device and fed to the magnetic read or write head, whereby the magnetic strip is rewritten. Said data can in addition be applied onto the heat-sensitive layer of the recording carrier. For this the recording device has a thermal delete head and a thermal print head for the heat treatment of the heat-sensitive layer. The delete head is here connected with an electric low temperature control and the print device is connected with an electric high temperature control. The low temperature control and the high temperature control are controlled by a print and delete control device which in turn is controlled by the central control device and receives the corresponding print data from the latter. It should also be mentioned that the processing of recording cards with integrated circuits is possible. A disadvantage here is that even slight positioning errors of the delete or print head relative to the recording carrier, which on the one hand can be caused by different temperature influences on the transport device for the recording carrier and on the other hand by an imprecise adjustment of the delete or print head, can lead to incomplete deletion results or to unclear write results. Most of all with an increasing period of use of this known recording device the obtained results get worse in particular with respect to the recording quality. In addition the plurality of communications protocols to be adhered to between the individual control devices is disadvantageous to the processing speed for a recording carrier obtainable by the recording device.

In the English language abstract of JP 04 197 656 A a further recording device for applying information stored on a magnetic recording layer of a magnetic card onto a layer of a recording medium changing colour due to the effect of heat is described. To delete information applied a delete roller heated by means of an independent heat source is contacted with the display region to be deleted and in this way the colour changing layer is brought into a transparent state. The disadvantage here is that magnetic cards cannot be used for forgery critical applications and only relatively small amounts of data can be recorded.

From the English language abstract of JP 02 050 897 A an additional device for applying information onto a magnetic card with a rewritable, heat-sensitive recording layer is known. The known recording layer can here be changed from an opaque into a transparent state and vice versa by the effect of heat and thus previously recorded information can be deleted. By heating specific parts of the recording layer to a defined temperature afterwards up-to-date information can be recorded onto the heat-sensitive layer. The heating device for deleting the heat-sensitive layer comprises a heat roller which is heated by an independent heat source remote from the heat roller and is thus heated indirectly. The disadvantage here is that the magnetic card is only suitable for recording relatively small amounts of data and by means of the indirectly heated heat roller, in particular on the standstill thereof, difficult to control fluctuations in temperature occur on the heat roller, which have a negative influence on the deletion result.

From JP 08 039 838 A a further recording apparatus for applying information onto a heat-sensitive layer of a recording medium is known. Previously recorded information on the recording carrier can be deleted by means of a deleting device designed as a heat roller in that the entire surface of the recording medium is heated. The heat roller is assigned a temperature sensor for detecting the current temperature. Despite monitoring the temperature of the heat roller, in particular with worn or deformed information carriers no satisfactory deletion results can be obtained.

In JP 62 267 788 A a fixing device for toner of a copying device applied to paper is described. In this case the copy payer is guided between a heat roller and a hollow heat drum. The heat roller has a friction increasing elastic layer made of an elastic material such as silicone, rubber of the like for a slip free drive of the naturally flexible copy paper. The object or piece of paper to be treated is in the shown fixing device in addition guided by adopting a specific wrapping contact angle about the heat roller and thereby heavily deformed. The treatment of mainly rigid objects is not possible using the shown device.

The objective of the invention is to provide a device, by means of which information to be edited on the basis of editable information in a data storage element provided on the information carrier can be made available to the user of an information carrier of this type in plain text.

The objective of the invention is achieved in that the deleting device is formed by a heatable roller with a flexible surface and the processing and transfer of the information of the electronic data storage element to the printing device is performed by a processor. The surprising advantage of this system is that manipulation of the chip can be combined with simultaneous conversion to readable information in a space-saving arrangement operating on a short time cycle, thereby obtaining a high throughput for manipulations of this type. A particular advantage is also that by the use of a delete roller the surface of the heat-sensitive layer is protected so that the service life of the information carrier is increased. A further advantage is that unevenness in the information carrier caused by the elastic surface can be evened out so that a complete deletion of the entire heat-sensitive layer is achieved.

It is also advantageous, to arrange the deleting device adjacent and the printing device for the heat-sensitive layer to achieve a rapid delete and writing process for the heat-sensitive layer, whereby due to the short distance of travel between the deleting device and the printing device a complete cooling of the heat-sensitive layer is prevented.

It is also advantageous to arrange at least one cooling roller made from a material that is a good heat conductor in the printing device so that the contrast on the heat-sensitive layer is improved by rapid cooling of the heat-sensitive layer after the printing process.

The construction space of the individual elements can be optimised by a system of grouping into different function stations, which means that the device can be designed in such a way that the essential functional elements used in the region of an information carrier to be processed can be set up relative to one another with a view to producing an optimum process run.

The control modules of the deleting and/or printing device are conductively connected to the heating elements forming the delete and write heads by means of a control switch, the heating elements are used alternately for a deleting and/or printing process, thereby reducing the number of such elements required, providing a space-saving configuration of the device and reducing the costs of such devices.

According to an advantageous embodiment the heating elements of the delete head are arranged immediately adjacent the heating elements of the write head and are thermally insulated so that the information to be applied to the information carrier can be changed without any loss of heat and hence without any loss of time.

In accordance with another embodiment, information consisting of a plurality of characters and/or graphics can be applied after a single positioning procedure and can be performed in the device whilst the information carrier is at a standstill, whereby with this type of configuration, the heating elements can be used optionally to control the deleting and/or printing process, thereby providing a better guarantee that the information will be reproduced and the information will be amended.

If the heating elements form groups, the heating elements of each group being arranged in a dot matrix pattern relative to one another, any graphical image supported by the control system can be reproduced starting from a character image.

The temperature control for the deleting and/or printing process can be set so as to be highly sensitive to the conditions required for the specific process and/or materials.

If the delete head is formed by a strip-shaped heating element provided with at least one temperature sensor integrated therein, an economical construction for the deleting device in terms of components is achieved.

If a pre-heating device is arranged upstream of the delete head in the direction of conveyance of the information carrier or the energy is applied to the heating elements as a permanent base load, hand-held information carriers, e.g. access cards for lifts, etc., are able to be processed in the open air, particularly in cold temperatures, with overall short time cycles.

According to an advantageous in which differing voltages can be applied to the heating elements as required by means of a control device, a pre-heating device upstream of the deleting and/or printing devices can be dispensed with for a series of applications.

According to the advantageous embodiment, in which the control device is conductively connected to a computer having an input terminal for operating purposes and the computer is provided with control and operating software, a high degree of flexibility in terms of structuring the information is achieved and hence the range of application of such devices is extended.

For a better understanding of the invention, the latter is explained in more detail by way of examples of embodiments illustrated in the Figures.

Firstly, it should be pointed out that parts common to the different embodiments described are provided with the same reference numbers and designated by the same component names and the disclosures made throughout this description can be transposed in terms of meaning to the same parts bearing the same reference numbers and same component names. Details of position given throughout the description, e.g. above, underneath, to the side, etc., relate to specific descriptions and drawings and, where a change of position is described, should be transposed to the new position in terms of meaning. Furthermore, individual characteristics of the different examples of embodiments illustrated can represent independent solutions of the invention.

Figure 1:
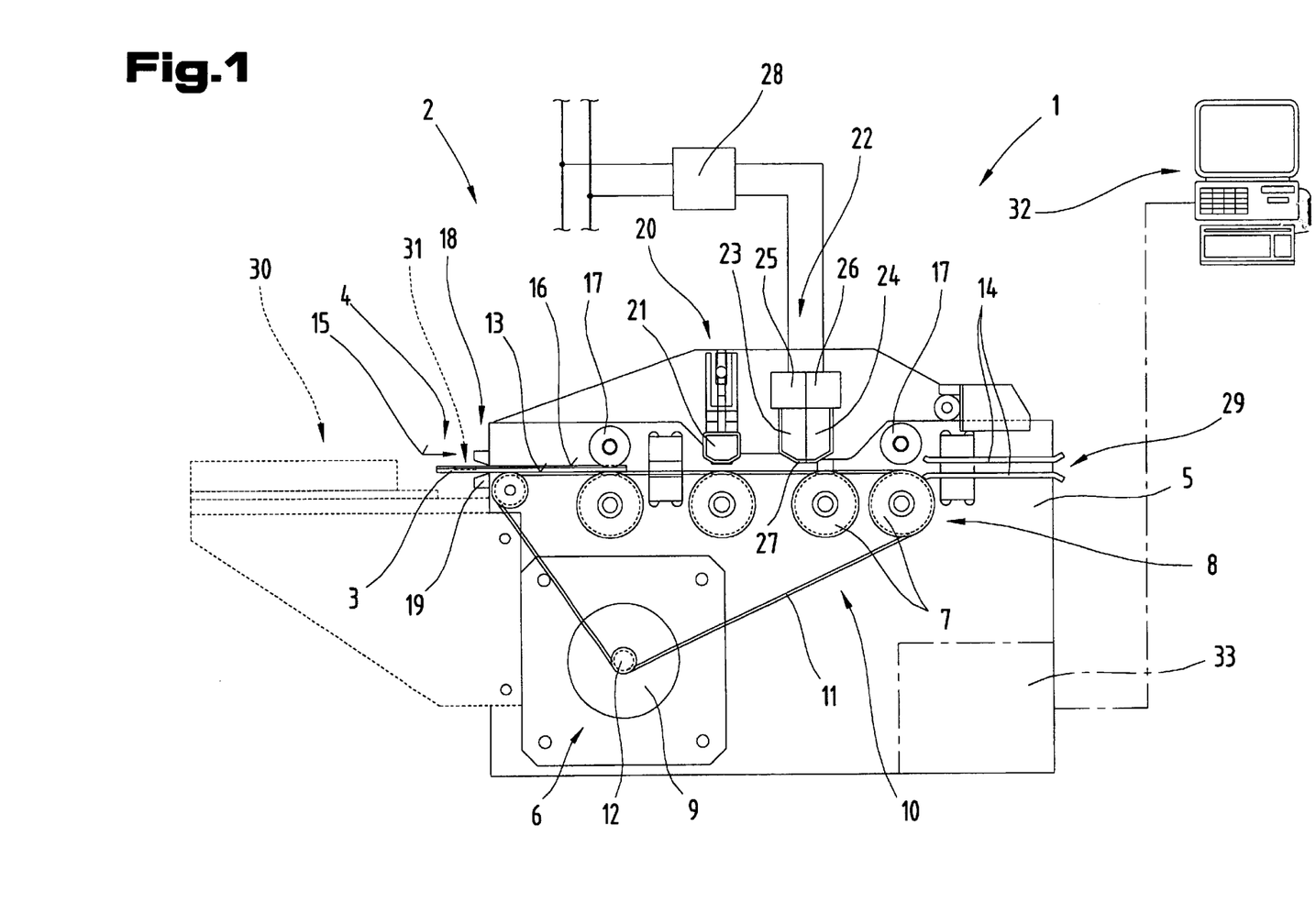
FIG. 1 a simplified, schematic view of a device according to the invention.

FIG. 1 shows in a simplified form a device 2 designed as a printing device 1 for the thermal application of information, e.g. characters, graphics, etc., in a heat-sensitive layer 3 of an information carrier 4 in card form. A transport device 8 for the information carrier 4, having transport rollers 7 driven by a drive motor 6, is arranged in a housing 5. The drive motor 6 is preferably formed by a stepping motor 9 so that it will be capable of feeding the information carrier 4 forwards through the device 2 and stopping precisely at exact, predetermined positions to perform processing procedures. Preferably, the transport rollers 7 are jointly driven by means of an endless drive element 10, e.g. a toothed belt 11, which is led across a drive gear 12 of the stepping motor 9. A surface 13 of the drive element 10 simultaneously provides a support surface for the information carrier 4. Clearly, for the accurate guiding of the information carrier 4, it may be necessary to provide side opening card guides 14. If the information carrier 4 is fed into the printing device 1 in the direction of conveyance—according to arrow 15—it is picked up by the transport device 8 and drawn between the transport rollers 7 and the drive element 10, optionally being supported by means of counter-rollers 17, which may be driven, acting on an upper side 16 of the information carrier 4, into the device 2.

In the direction of conveyance—according to arrow 15—a feed-in device 18, e.g. lead-in rockers 19, is arranged before a cleaning device 20, which may be provided as a first possible processing station for the information carrier 4. Here, any adhering dirt or dust is cleaned off the upper side 16 of the information carrier 4 by means of a cleaning head 21 acting on the upper side 16, so as to prevent any disruptions to the further processing of the information carrier 4. Such cleaning may be carried out using dry methods or by applying a film of cleaning fluid. Preferably, the cleaning head 21 has a felt-type coating facing the upper side 16 of the information carrier 4 which lies on the upper side of the information carrier 4 as it is fed through, and thus wipes away particles of dirt.

Following the cleaning device 20 in the direction of conveyance—according to arrow 15—the next processing station is a deleting and/or printing device 22 for applying or changing by deleting and then rewriting plain text in the form of characters or graphics, which are applied to the heat-sensitive layer 3 of the information carrier 4 by applying heat to this layer 3.

Layers 3 or films of this type are known from the prior art and a so-called bistable heat-sensitive layer 3 or film is used for this particular case. This film is characterised in that when heat-treated appropriately in compliance with predetermined temperature criteria, it can be reversibly changed between an opaque state and a transparent state. A film of this type is known from European patent EP 0 431 155 B1 but is also known from the publication "Thermo-reversible imaging media" by Ricoh-Electronics Inc.

The device 2 according to the invention is designed so that the deleting and/or printing device 22 is modular in structure and a delete head 23 and a write head 24 are arranged adjacent to one another as a modular unit. The delete head 23 and the write head 24 preferably comprise a larger number of heating elements 27 that are heat-insulated from one another and to which power can be applied individually by means of a control module 25 for deleting and a control module 26 for printing.

If the device 2 is configured in this manner, the deleting and/or printing process is performed in a line-by-line stepped process, for example, whereby the information carrier 4 is positioned by means of the transport device 8 with respect to the deleting and/or printing device 22 so that it is ready for the deleting and/or printing process line by line.

Energy is applied to the heating elements 27 to produce the requisite temperature for the deleting and/or printing process by means of a performance control circuit 28, which on the one hand minimises processing cycle times and on the other prevents the sensitive heating elements 27 from being damaged in the event of system failures. A performance control circuit 28 of this type can be provided in the form of a monoflop circuit, for example.

After the plain text information has been changed or freshly applied in the layer 3, the transport device 8 feeds the information carrier 4 to an output device 29, where the user may remove it from the device 2.

As also illustrated, the device 2 may have, in a design known from the prior art, an upstream chip processing station 30 in the direction of conveyance—according to arrow 15. This will allow information carriers 4 which are to be provided with an electronic data storage element 31, e.g. a processor chip, laser CD, etc., to be processed.

Preferably, the device 2 is controlled by a computer 32, e.g. a PC, by means of which the requisite procedures pertaining both to the automatic identification of the information carrier 4, e.g. detecting data in the data storage element 31, and changing or applying new information in plain text or graphic form, can be performed and monitored. This computer 32 is electrically connected to a control device 33 arranged in the device 2, for example, and the relevant data exchange with the device 2 is performed by this computer 32. For specific application purposes, however, it is also possible to fit the device 2 directly with a control panel, in order that the data needed to control the processing procedures can be input directly on site.

Figure 2:
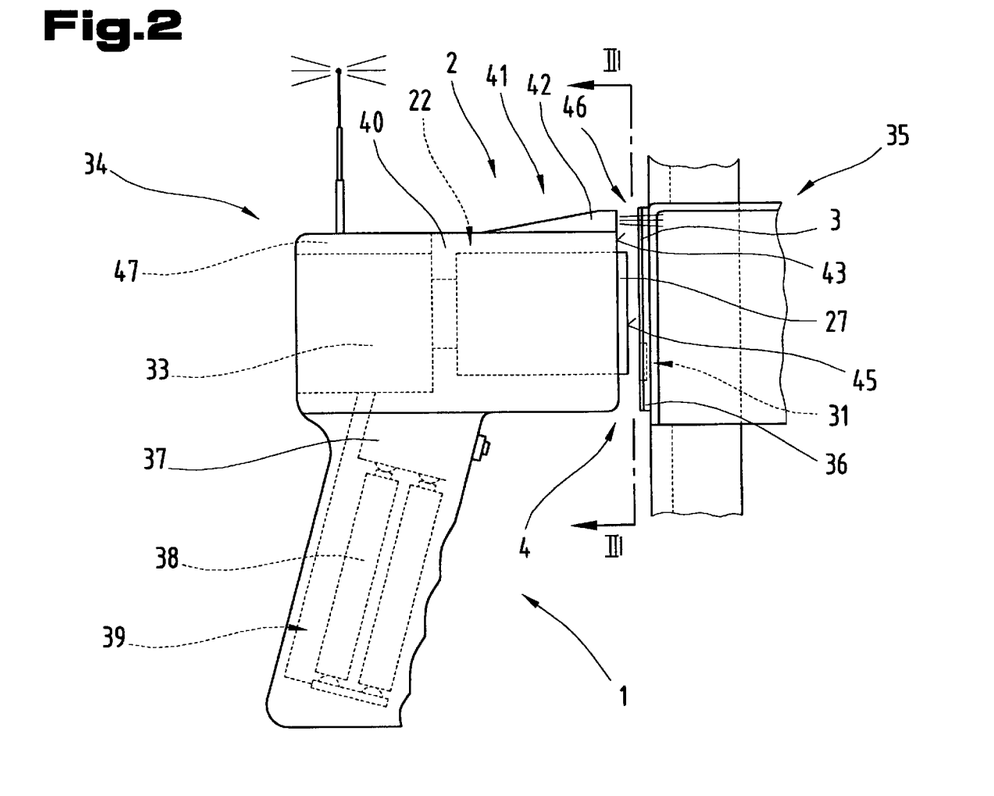
FIG. 2 another embodiment of the device proposed by the invention, in a simplified, schematic view.
Figure 3:
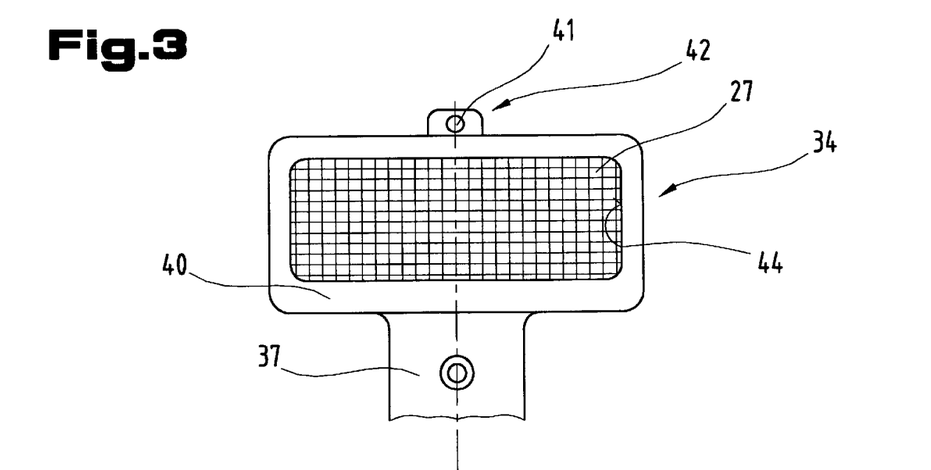
FIG. 3 the device in a view, along the lines III—III of FIG. 2.

FIGS. 2 and 3 illustrate a possible embodiment of the device 2 as a mobile hand-held device 34 used for applying plain text information onto the information carrier 4, e.g. on a sales shelf 35 with merchandise labelling cards 36. The device 2 is of a gun-type design, for example, and has a handle 37 in which a power supply 39 is provided in the form of batteries 38, for example. Projecting out from the handle 37 more or less at a right-angle is a device head 40 in which the control device 33 and the deleting and/or printing device 22 are arranged. It is also possible to house a reading device 42 in the form of a scanner 41, for example, in the device head 40. The construction of the device 2 is such that a front face 43 of the device head 40 facing the information carrier 4 has an orifice 44, in which the heating elements 27 are arranged and front faces 45 of the heat elements 27 for applying heat to the heat-sensitive layer 3 project slightly over the front face 43 or are arranged more or less in a common plane.

With this design, the heating elements 27 are arranged in an approximately rectangular field in the form of a dot matrix, being thermally insulated from one another, thereby enabling the heating elements 27 to be controlled accordingly so that the thermal effect on the layer 3 will produce any characters, patterns, graphics, etc. This being the case, the heating elements 27 can be raised to different temperature levels to enable them to assume the function of deleting and applying information, in other words printing, which means that it is not necessary for the deleting and/or printing device 22 be provided separately.

By way of example for a series of possible applications a specific application for an information carrier 4 designed as a merchandise labelling card 36 using the printing device 1 of the invention, in this case a mobile version, is described. By means of a scanner 41 a barcode 46 that is also printed on the information carrier 4 is read, the content of which will forms an article number for the goods provided on the sales shelf 35. This article number is wirelessly transmitted via an infrared transmitting and receiving device 47, for example, to a central point which will then transmit to the control device 33 of the printing device 1, via the same transmission route, the information pertaining to the selling price of the item current at the time. In the control device 33, this information is now converted so as to produce a plain text presentation of the information in the heat-sensitive layer 3 by applying the requisite energy that will enable the data storage elements 31 to produce the presentation of the characters. If the merchandise labelling card 36 already has plain text information on it, this is deleted by an amending process whereby heat is applied to the heat-sensitive layer 3 before applying new information in plain text. Clearly, a whole range of further application possibilities over and above this specific example of an application are conceivable.

Figure 4:
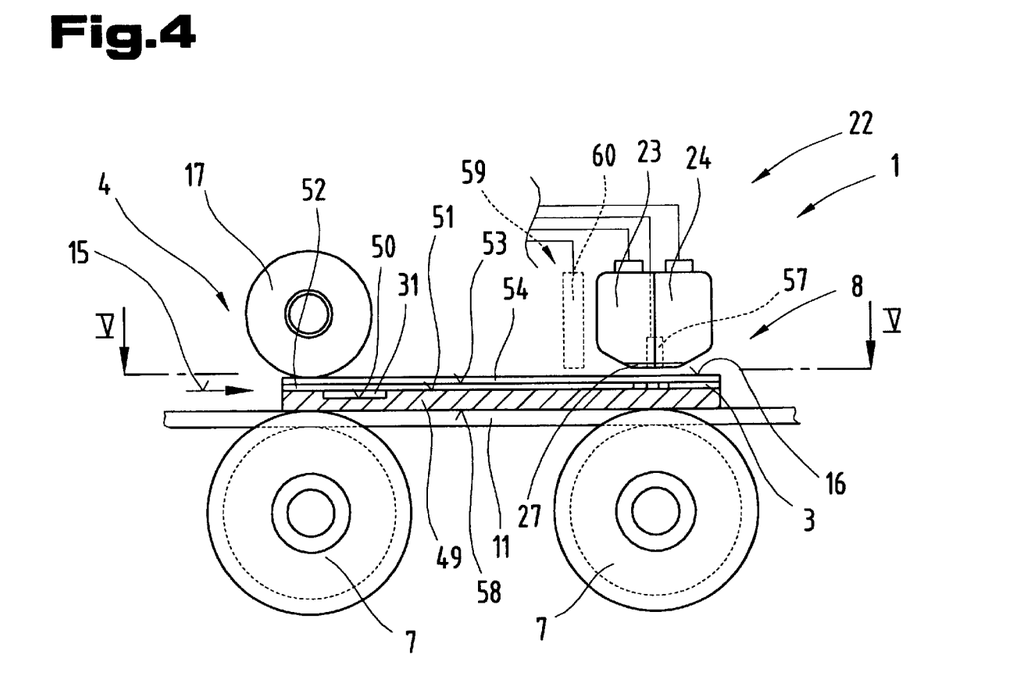
FIG. 4 a part-region of the device with an information carrier according to the invention.
Figure 5:
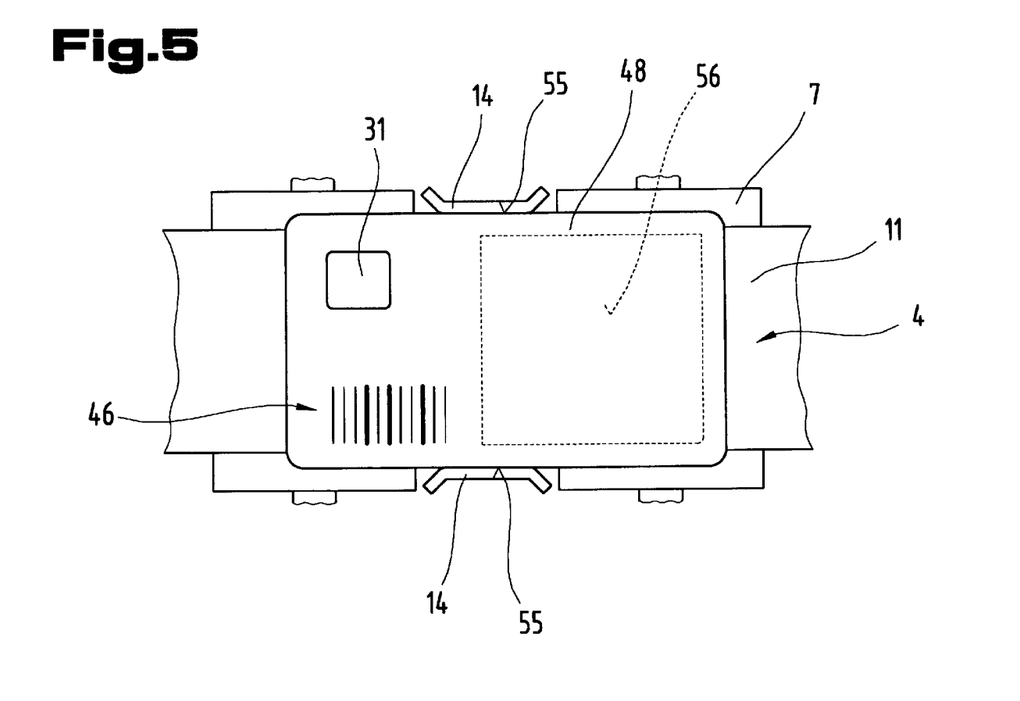
FIG. 5 the device with the information carrier, in cross section along the lines V—V of FIG. 4.

FIGS. 4 and 5 show the information carrier 4 for example as a smart card 48 for cashless payment transactions in the region of the delete head 23 and the write head 24 of the printing device 1. On a substrate 49, e.g. a base material made from plastic, the smart card 48 has the data storage element 31, e.g. a processor chip, in a recess 50. Applied to one surface 51 of the substrate 49 is the layer 3, comprising a heat-sensitive film 52, joined to the substrate 49 to prevent displacement. A protective layer 54 is arranged on an upper side 53 of the film 52 facing away from the substrate 49. This protective layer 54 consists of a transparent material, e.g. a scratch-resistant and highly wear-resistant plastic layer.

In the printing device 1, the smart card 48 is conveyed by means of the transport device 8, e.g. on the toothed belt 11 running over transport rollers 7. Card guides 14 for lateral positioning are assigned to the longitudinal side edges 55 of the smart card 48. Counter-rollers 17 are preferably provided facing the transport rollers 7 and acting on the upper side 16 of the smart card.

As illustrated, in addition to the data storage element 31, the information carrier 4 may also have a barcode 46, e.g. for an automatic identification of the smart card 48 in a detection device, which operates externally and does not have a reading device for the electronic data storage element 31.

The smart card 48 is fed through the printing device 1 in the direction of conveyance—according to arrow 15—until a marker field 56 in which the plain text information is to be inserted reaches the working region of the delete head 23. The heating elements 27 are activated to delete any existing characters and the heat-sensitive film 52 brought to a temperature at which it may be converted to one of two possible states, opaque or transparent. As the smart card 48 is fed onwards in the direction of conveyance—according to arrow 15—into the region of the write head 24 arranged immediately after the delete head 23, a presentation of the plain text is applied by activating the heating elements 27 to apply the requisite temperature to the film 52 at which the film 52 is converted to the second state, transparent or opaque. The delete head 23 and the write head 24 have at least one temperature sensor 57 in the region of the heating elements 27 in order to monitor the temperature, although it would also be possible to regulate and control the working temperature by monitoring the internal resistance of the heating elements 27.

The data storage element 31 can be designed as a so-called inductive chip for contactless processing. It is also possible to use a laser-operated storage element. Of course, it is also possible to provide the information carrier 4 with another heat-sensitive film on its rear side 58, which could then be protected against mechanical stresses by a protective layer. This type of design also offers the option of additionally applying large-format plain text information, graphics, etc., on the rear side 58 of the information carrier 4.

As also indicated by broken lines, there is also the option of providing a pre-heating device 59 upstream of the deleting and/or printing device 22 in the direction of conveyance—according to arrow 15—as indicated by the broken lines, by means of which the information carrier 4 may be pre-heated so as to produce an initial temperature required for the deleting and printing process, thereby reducing the required processing to very short cycle times. This being the case, the pre-heating device 59 may consist of a stationary heating element 60 thermally acting on the upper side 16. The heating element 60 could also be provided in the form of a heatable roller lying on the information carrier 4.

Figure 6:
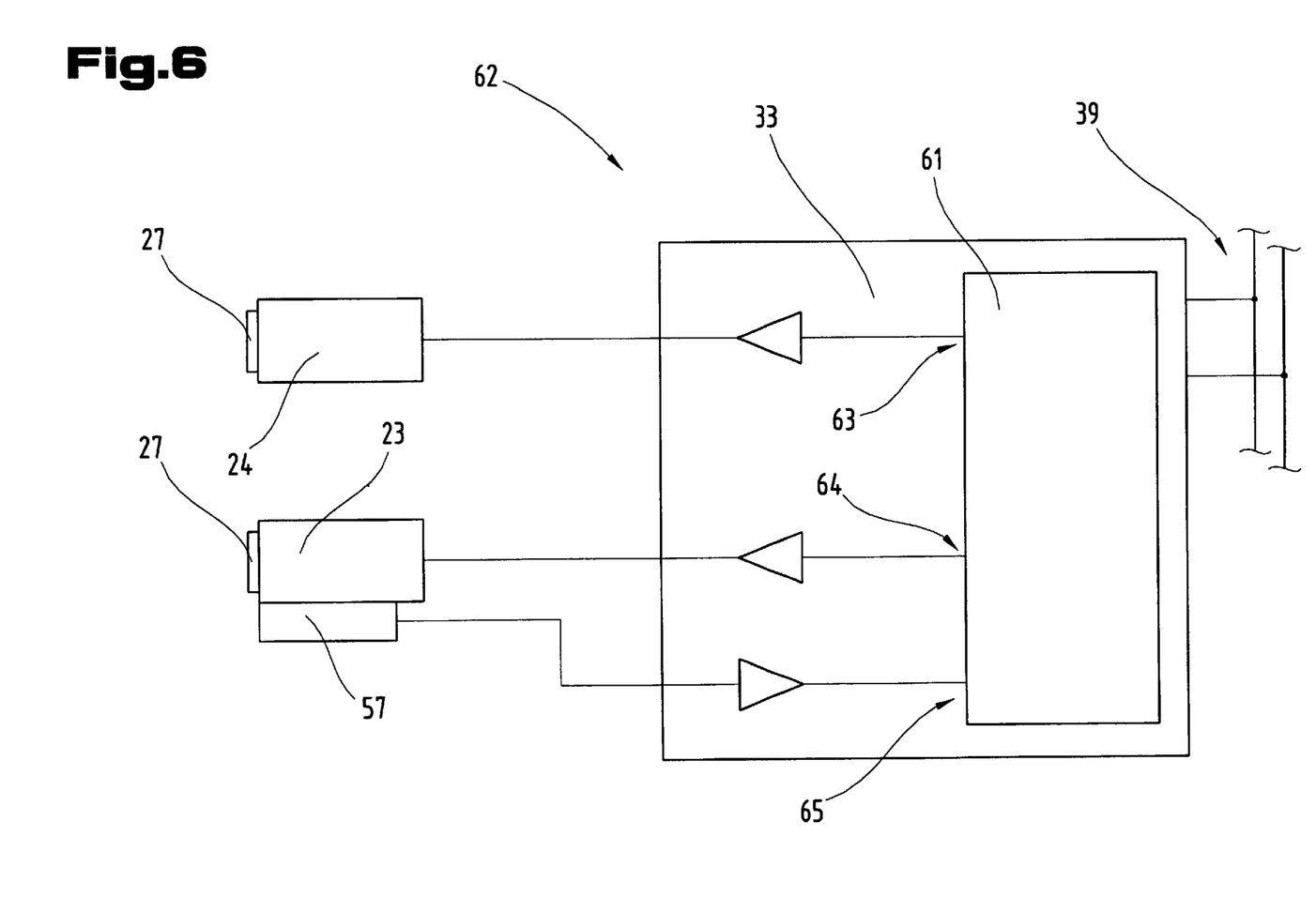
FIG. 6 a block diagram of the performance control circuit of the device according to the invention.

In FIG. 6 in a block diagram a performance control circuit 62 for controlling the delete head 23 and the write head 24, provided with a processor 61, is shown. Stored in the processor 61 is the control programme in the form of a control algorithm, by means of which performance of the delete head 23 and/or write head 24 is controlled on the basis of pre-set parameters, e.g. requisite temperatures related to specific processes, actual temperature, required heating time and heating times already reached, data pertaining to the heating elements. The control device 33, comprising the processor 61 and being supplied with electrical energy by means of the power supply 39, is conductively connected to the delete head 23 and the write head 24 by means of outputs 63, 64. In the embodiment illustrated here, the temperature sensor 57 is electrically connected to the input 65 of the control device 33. Power is applied to the heating elements 27 in the form of current pulses, the pulse width needed to operate the write head 24 and/or the delete head 23 being regulated by the processor 61 on the basis of input data incorporated in the control algorithm, e.g. for the temperature sensor 57, the hysteresis of the heating elements 27 derived from the temperature of the heating-up process and, as required, the heat already applied.

The control algorithm evaluates the input parameters and, taking account of the system settings, e.g. measurements taken on the heating elements 27 and possible energy output from the heating elements 27, tracks the pulse width for charging the heating elements 27 of the write head 24 and/or delete head 23.

Thus the heating elements 27 can be very rapidly and accurately brought to the requisite temperature, and regulation can be achieved within the required narrow temperature limits.

In order to secure the functional elements, e.g. the heating elements 27, the control algorithm has additional control functions.

Figure 7:
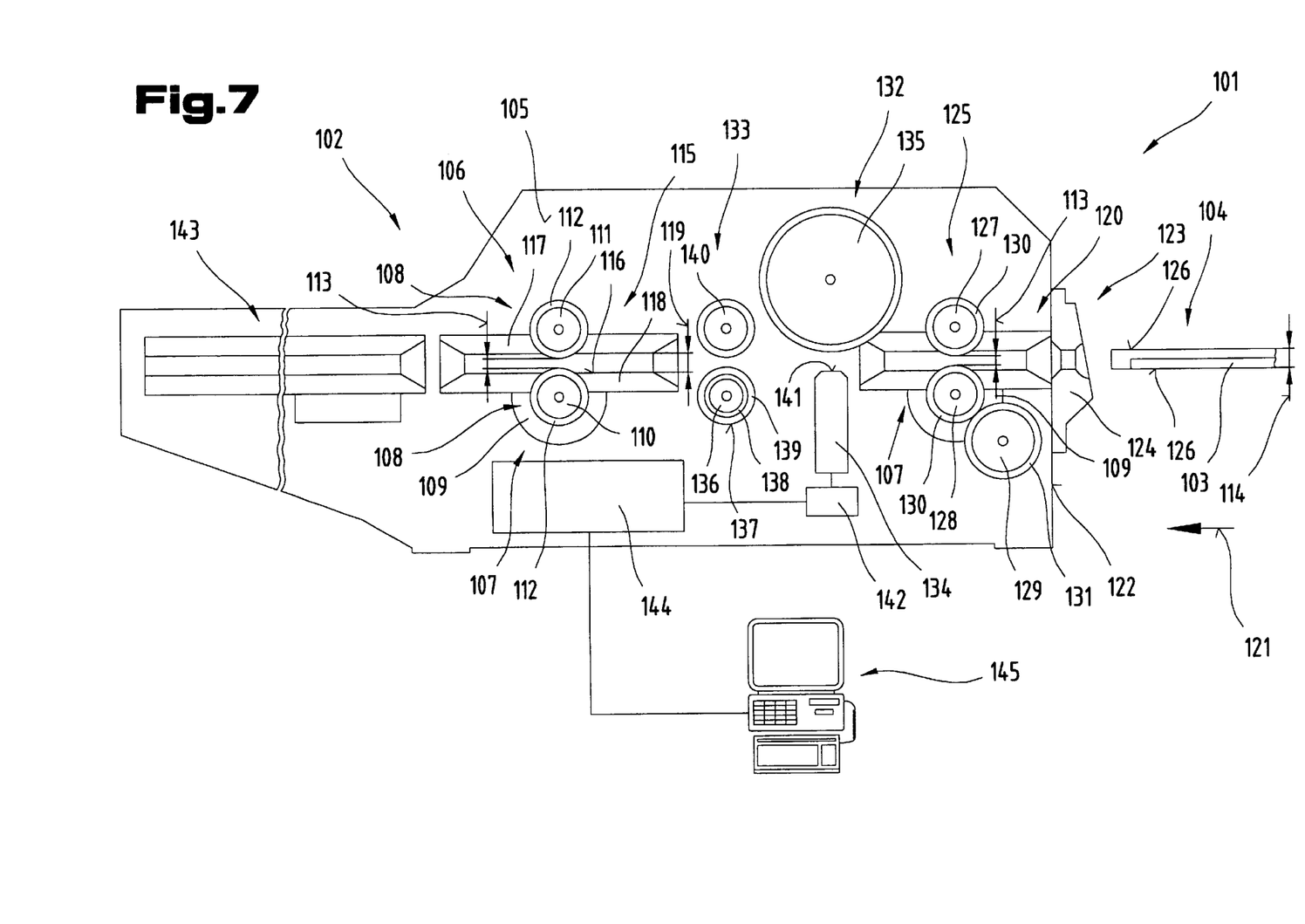
FIG. 7 a simplified, schematic diagram of another embodiment of the device according to the invention.

FIG. 7 is a simplified illustration of a device 102 provided in the form of a printing device 101 for thermally applying information,. e.g. characters, graphics, etc., to a heat-sensitive layer 103 of an information carrier 104 in card-form.

Arranged in a housing 105 is a transport device 106, for example, comprising a drive motor 107 and several transport rollers 108. The drive motor 107 is preferably provided in the form of a stepping motor 109, so that the information carrier 104 can be accurately controlled as it is fed forward through the device 102. Using a stepping motor 109, it will be possible to through-feed the information carriers 104 and stop at precise, predetermined positions in readiness for the processing procedures that will be run at specific positions. Preferably, one of the two transport rollers 108 is directly coupled with the stepping motor 109, so that as the information carrier 104 is fed forwards, the information carrier 104 can be positioned without any backlash. If the stepping motor 109 were coupled with one of the two transport rollers 108 by means of a belt, as is the case with the prior art, wear on the belt could cause interruptions in the transport device 6, in particular the forward motion of the information carrier 104, which would lead to the information carrier 104 being inaccurately positioned. In order to guarantee accurate and faultless operation of the transport device 106 in a system of this type, it would be necessary to provide tensioning devices for a belt drive inside the printing device 101, which would mean having to increase the construction size of the printing device 101 significantly.

The embodiment of the transport device 106 illustrated here is designed so that the two oppositely lying transport rollers 108 are a drive roller 110 and a pressure roller 111. This being the case, both the drive roller 110 and the pressure roller 111 have an elastic layer 112, in particular of rubber, on their external surface. The drive roller 110 and the pressure roller 111 of the transport device 106 are arranged apart from one another so as to form a specific distance 113 between the two transport rollers 108. This distance 113 is slightly smaller than a thickness 114 of the information carrier 104, so that the elastic layer 112 deforms as it receives the information carrier 104 in the transport device 106, thereby causing a corresponding pressure to be applied to the faces of the information carrier 104 preventing the transport rollers 108 from sliding across the surface of the information carrier 104. As the stepping motor 109 is activated and as a result of the pressure exerted on the information carrier 104, a forward motion is produced depending on how the stepping motor 109 is controlled. Clearly, it would also be possible to mount the pressure roller 111 by means of a bearing device that could be moved on the housing 105 so that the pressure roller 111 could be moved back from the drive roller 110 to suit the thickness 114 of the information carrier 104, in which case the bearing device would be so designed that as the distance 113 between the two transport rollers 108 is lengthened, the pressure in the direction opposite the movement of the pressure roller 111 is increased causing pressure to be applied to the faces of the information carrier 104 accordingly and preventing the transport rollers 108 from sliding.

Arranged in the region of the transport device 106 is a guide device 115 for the information carrier 104, a support surface 116 being formed for the information carrier 104. Accordingly, the guide device 115 has two faces 117, 118 extending parallel to one another and arranged at a distance 119 apart from one another. The distance 119 is slightly larger than the thickness 114 of the information carrier 104. To this end, it is again possible that the two faces 117, 118 can be moved relative to one another so that with a different thickness 114 of the information carriers 104 the guide device 115 can be adjusted to the corresponding thicknesses 114 of the individual information carriers 104. The guide device 115 ensures that as the information carrier 104 is fed into the housing 105 of the printing device 101, the information carrier 104 does not become misaligned with the individual components, because the information carrier 104 is guided by the two parallel faces 117, 118 exactly in the middle of the transport device 106. Of course, the information carrier 104 could be guided even more accurately in the printing device 101 if lateral guide devices 120 in particular were provided in addition. As the information carrier 104 is fed in the direction of conveyance—according to arrow 121—into the printing device 101 it is picked up by the transport device 106 and fed between the two transport rollers 108 or by the drive roller 110 and the pressure roller 111 into the device 102.

In the direction of conveyance—according to arrow 121—following a feed-in device 123, e.g. a feed-in rocker 124, arranged on the external face 122 of the printing device 101 is a first processing station for the information carrier 104, provided in the form of a cleaning device 125, by means of which any adhering dirt or dust can be cleaned off at least the upper side 126 of the information carrier 104, in particular the layer 103. To this end, the cleaning device 125 has two oppositely lying rollers 127, 128 and a cleaning roller 129. The two rollers 127, 128 may be of the same design as the transport device 106, i.e. one of the two rollers 127, 128 is coupled with a drive motor 107, in particular a stepping motor 109 so that a forward motion is applied in the direction according to arrow 121 immediately the information carrier 104 is fed in. To this end, an elastic layer 130 is again provided on one of the rollers 127, 128. The rollers 127, 128 are so arranged that a distance 113 is formed between the two rollers 127, 128, so that as the information carrier 104 is inserted pressure is applied accordingly on the upper side 126 of the information carrier 104. The cleaning roller 129 is in direct contact with the two rollers 127, 128, in particular with the roller 128 and the cleaning roller 129 has a softer and more adhesive layer 131 than the layer 130 of the two rollers 127, 128 allowing the dirt to be transferred from the roller 128 to the cleaning roller 129 due to the direct contact. Of course, it would also be possible to provide a cleaning roller 129 for the other roller 127.

The advantage of using only one cleaning roller 129 is that the cleaning roller 129 is arranged so as to co-operate with the roller 127, 128, in particular roller 128, which is in contact with layer 103 of the information carrier 104. Instead of cleaning by means of a dry layer 131, it would also be possible to apply a liquid film, in particular a cleaning fluid, to one of the two rollers 127, 128.

Following the cleaning device 125 in the direction of conveyance—as according to arrow 121—another processing station is provided for the information carrier 104 in the form of a printing device 132 which applies a plain text message in the form of characters or graphics which are transferred to the heat-sensitive layer 103 of the information carrier 104 by applying heat to this layer 103.

Layers 103 or films of this type are known from the prior art and a so-called bistable heat-sensitive layer 103 or film is used for this particular case. This layer 103 is characterised in that when heat-treated appropriately in compliance with predetermined temperature criteria, it can be reversibly changed between an opaque state and a transparent state. A film of this type is known from European patent EP 0 431 155 B1 for example.

The device 102 according to the invention is modular in design so that when processing the layer 103 a deleting device 133 is arranged immediately adjacent to the printing device 132. The printing device has a write head 134 and an oppositely lying pressure roller 135. This being the case, the write head 134 is mounted on the housing 105 of the printing device 101 so that it is stationary, whilst the pressure roller 135 is movably mounted on the housing 105. This pressure roller 135 has a specific purpose in that as the information carrier 104 is fed in, the pressure roller 135 presses it against the write head 134. The pressure roller 135 may in turn be coupled with a drive. Of course, it would also be possible to provide several transport devices 106 before and after the pressure roller 135 so that the pressure roller 135 would be operated by the conveying motion of the transport devices 106 without the need for a drive.

The deleting device 133 is designed as a heatable roller 136. In order to ensure that the heat-sensitive layer 103 can be perfectly deleted, it has a flexible surface 137 so that any unevenness can be evened out.

In order to be able to delete the heat-sensitive layer 103, the layer 103 is heated to a specific temperature. To this end, a resistance paste 138 or resistance coating is applied to the roller 136, which may be a ceramic roller, for example. So that it can be supplied with energy, the resistance paste 138 can be connected to an energy source by means of contact springs so that when power is applied to it, the resistance paste 138 heats up and, as it comes into contact with the layer 103, it heats the layer 103. In order to produce the elastic surface 137, a coating 139 is applied on top of the resistance paste 138, in particular of silicone. In order to ensure that the procedure for deleting the layer 103 works perfectly, a pressure roller 140 is arranged on the oppositely lying side of the roller 136 so that as the information carrier 104 is pushed into the deleting device 133, the layer 103 is pressed against the heated roller 136 of the deleting device 133.

To ensure that the heat-sensitive layer 103 is perfectly deleted, the resistance paste 138 must first be heated to a requisite temperature by applying energy, in particular current and voltage, so that the heat-sensitive layer 103 is deleted as it continues to be fed on in the direction of arrow 121 or vice versa. The advantage of designing the deleting device 133 as a roller 136 resides in the fact that the flexible surface 137, which assumes the role of transferring heat to the heat-sensitive layer 103, can easily compensate for any unevenness in the heat-sensitive layer 103, i.e. the entire surface, even of bent plastic cards, in particular information carriers 104, can be deleted. Another advantage resides in the fact that the heating element or resistance paste 138 does not brush across the information carrier 104, as is the case with the prior art, but rather the rolling action of the deleting device 133 means that significantly less dirt will get onto the flexible surface 137 and damage to the surface of the layer 103 is prevented, thereby requiring a much reduced maintenance cycle and providing a significantly higher service life for the deleting device 133.

To enable the heat-sensitive layer 103 to handle graphics or characters set up by the printing device 132, the write head 134 has a large number of heating elements 141, thermally insulated from one another. Using this embodiment of the device 102, the printing process proceeds in a line-by-line stepped procedure whereby the information carrier 104 is positioned relative to the printing device 132 by means of the transport device 106 and using the pressure roller 135 with a drive so that the print procedure can be run line by line.

In order to obtain the temperature needed for the printing process, energy is applied to the heating elements 141 by means of a performance control circuit 142, known from the prior art, which minimises processing times on the one hand and protects the sensitive heating elements 141 from damage that might otherwise be caused by system errors on the other.

To this end, a temperature sensor or a heating element may be arranged in the heatable roller 136 in order to monitor the temperature, the output of the temperature sensor or heating element being connected to a control device which regulates the energy fed to the resistance paste 138 depending on the temperature required.

The information carrier 104 is fed by the transport device 106 to a chip card interface 143, for example, connected to the individual processing stations so that additional information can be read off from the information carrier 104. To this end, the information carrier 104 may be provided as a magnetic card or chip card, which means that additional information can be read off from the chip card interface 143 and written to the information carrier 104. Clearly, it would also be possible for the data read from the information carrier 104 in plain text to be transferred to the heat-sensitive layer 103. The chip card interface 143 may be provided in any form of chip card interface 143 or card reading device known from the prior art.

As illustrated schematically, the individual components or processing stations of the printing device 101 may be controlled by a control device 144, i.e. the control device 144 controls the transport device 106, the printing device 132 and the deleting device 133. The control device 144 may also be connected to a computer 145, e.g. a PC.

Preferably, the printing device 101 is controlled by the computer 145, by means of which the relevant process inherent both in running and monitoring the procedures for automatically identifying the information carrier 104 by detecting data from a data storage element on the information carrier 104 and amending or applying new information in plain text and in graphic form. Accordingly, the computer 145 is electrically connected to the control device 144 provided in the printing device 101 and this computer 145 handles the requisite exchange of data with the printing device 101. For the purposes of specific applications, however, it would also be possible to fit the printing device 101 with a direct control panel so that data for controlling the processing procedures can be entered directly on the spot.

In the embodiment of the printing device 101 illustrated as an example here, the information carrier 104 is inserted by a user in the feed-in rocker 124 of the feed-in device 123 so that the information carrier 104 is fed through the cleaning device 125 by means of the rollers 127, 128, in the direction of the arrow 121, into the interior of the printing device 101. To this end, it is possible to arrange a contact in the feed-in device 123 which closes as the information carrier 104 is inserted so that the control device 144 can detect that an information carrier 104 has been inserted, thereby causing power to be applied to the components needed to convey the information carrier.

The deleting device 133 is then activated by the control device 144 to heat the resistance paste 138 to a temperature at which the heat-sensitive layer 103 will be deleted so that the heat-sensitive layer is deleted as the information carrier 104, in particular the layer 103, passes over the roller 136, i.e. the characters and graphics arranged in the heat-sensitive layer 103 will be deleted. Preferably, the heat-sensitive layer 103 is not deleted until after the chip card interface 143 has been processed, in other words as the information carrier 104 is fed out from the printing device 101, as a certain period of time is needed to heat up the deleting device 133. To this end, it may also be that when the printing device 101 is activated, the printing device 132 is heated to a pre-set temperature producing a fast print cycle as the information carrier 104 is fed out. Finally, the transport device 106 feeds the information carrier 104 to the chip card interface 143 to allow a reading process to be performed by the chip card interface 143.

When the chip card interface 143 has completed the print-reading process, a signal is transmitted from the chip card interface 143 to the control device 144, prompting the control device to control the transport device 106 and those components needed to convey the information carrier 104 in the direction opposite to the arrow 121 so that an advancing movement is effected in a direction opposite the arrow 121, in other words in the direction of the feed-in rocker 124. The control device 144 simultaneously activates the performance control circuit 142 of the write head 134 so that the heating elements 141 of the write head 134 are heated to the requisite printing temperature. The information carrier 104, in particular the layer 103, is then moved along through the deleting device 133 so that the layer 103 can be deleted and the layer 103 can be printed by the write head 134, the individual heating elements 141 being specifically controlled by means of the write head 134 so as to print the characters and graphics onto the heat-sensitive layer 103. The write head 134 is not described in explicit detail since any write head 134 known from the prior art can be used as the write head 134 here. The information carrier 104 is then conveyed out from the feed-in rocker 124 enabling the user to remove the card, in particular the information carrier 104, and the print-reading process for the information carrier 104 is shut down.

Figure 8:
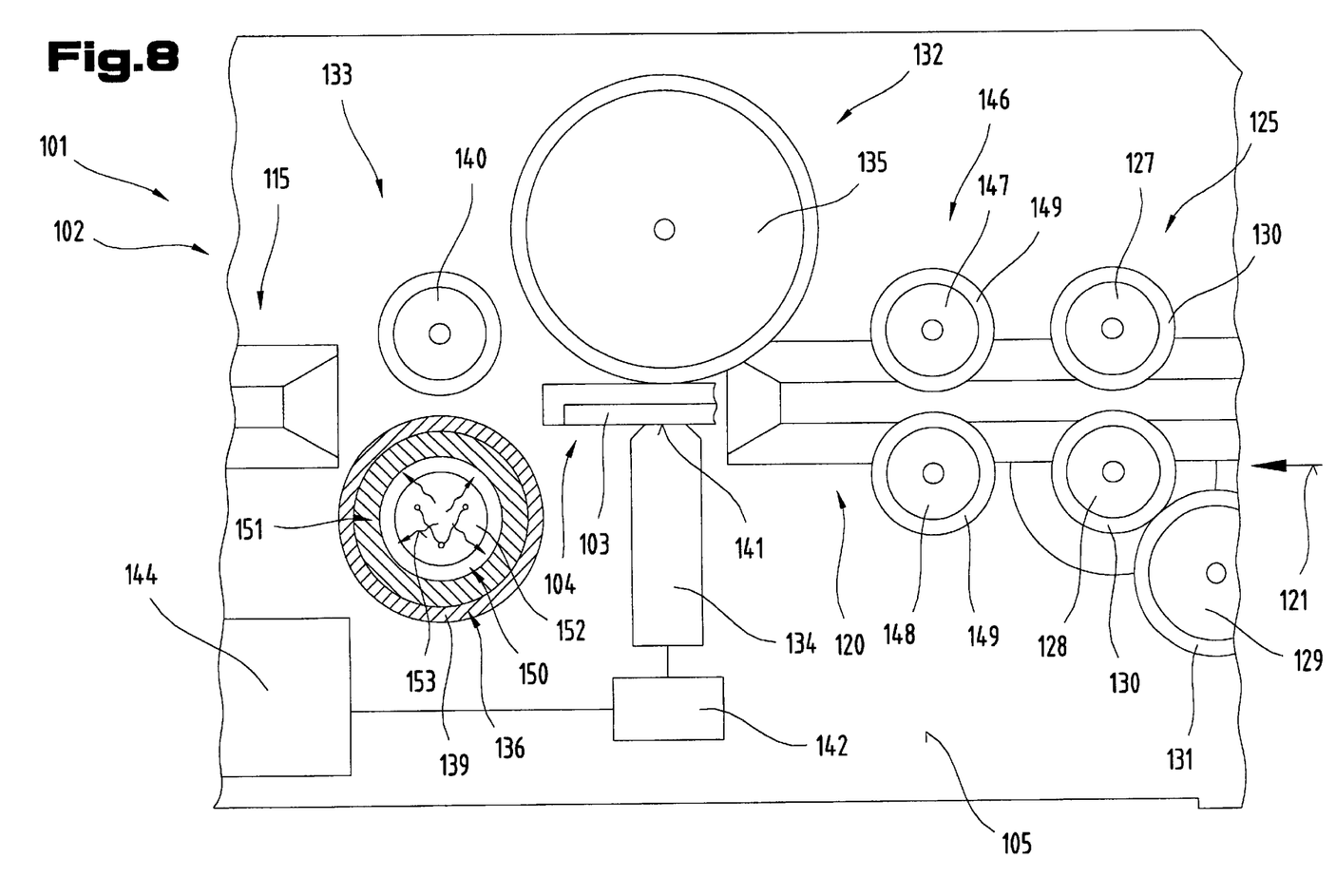
FIG. 8 a simplified, schematic diagram of another embodiment of the device according to the invention.

FIG. 8 illustrates another embodiment of the printing device 101. A part-section of the housing 105 with the cleaning device 125, printing device 132 and deleting device 133, similar to those of FIG. 7, is described in respect of this embodiment.

In addition the printing device 101 comprises a cooling device 146 arranged before the printing device 132 in the direction of conveyance—according to arrow 121. The cooling device 146 consists of two cooling rollers 147, 148, again having a flexible layer 149 on their surface to allow adjustment to compensate for any unevenness in the information carrier 104. The purpose of the cooling device 146 is to provide rapid cooling of the heat-sensitive layer 103 heated by the printing device 132 at the end of printing in order to improve the contrast of the finished object. Accordingly, it is also possible to use heat-sensitive materials or layers 103 of the type which produce a specific finish due to rapid cooling. With the material "Thermo Rewrite" of the company Mitsubishi Paper Mills an extremely short cycle time for printing the information carrier 104 is achieved due to the rapid cooling of the heat-sensitive layer 103 after printing by the printing device 132. Another advantage resides in the fact that cooling the layer 103 produces significantly improved contrast in the finish of the information carrier 104.

The cooling rollers 147, 148 can therefore be made from a material that readily picks up heat and is a good heat conductor. For example, the cooling rollers 147, 148 may be made from aluminium.

It can also be seen from this embodiment that the roller 136 is no longer heated by means of a resistance paste 138 as is the case with the deleting device 133 illustrated in FIG. 7 but a source of heat energy is arranged in the interior of the roller instead, i.e. the roller 136 has an inner chamber 151 in which the heat energy source 150 is housed. The heat energy source 150 can be a lamp 152, for example. With an embodiment of this type, it is also essential to use a material that conducts heat efficiently for the roller 136, such as an aluminium tube or copper tube or steel. Of course, it is also possible to provide the flexible layer 139 on the external face of the roller 136 to compensate for any unevenness in the information carrier 104.

The deleting device 133 then operates so that when energy is applied to the lamp 152, in particular the heat energy source 150, the lamp 152 begins to glow and the light beam 153 or high increase in heat of the lamp 152 causes a build-up of heat in the interior of the roller 136, thereby heating up the material of the roller 136 so that the heat-sensitive layer 103 is deleted as the information carrier 104 moves across the roller 136. To this end, the heat energy source 150 in the interior of the tube 136 may be stationary and the tube 136 will be displaced around the heat energy source 150 in the direction in which the information carrier 104 is moving. It is also possible however, the heat energy source 150 may move with the roller 136, in which case sliding contacts will be provided as a means of supplying the energy.

With the printing device 101 illustrated here, it is possible that only on the moving out the information carrier 104 in the direction opposite the conveyance direction of according to arrow 121 does the deleting device 132 delete the heat-sensitive layer 103 and the printing device 132 print the respective characters and graphics onto the layer 103. The information carrier 104, in particular the heat-sensitive layer 103, is then cooled by the cooling device 146 so that as it leaves the printing device 101, the information carrier 104 will already have been cooled to such a degree that no further changes can be imparted to the heat-sensitive layer 103.

Figure 9:
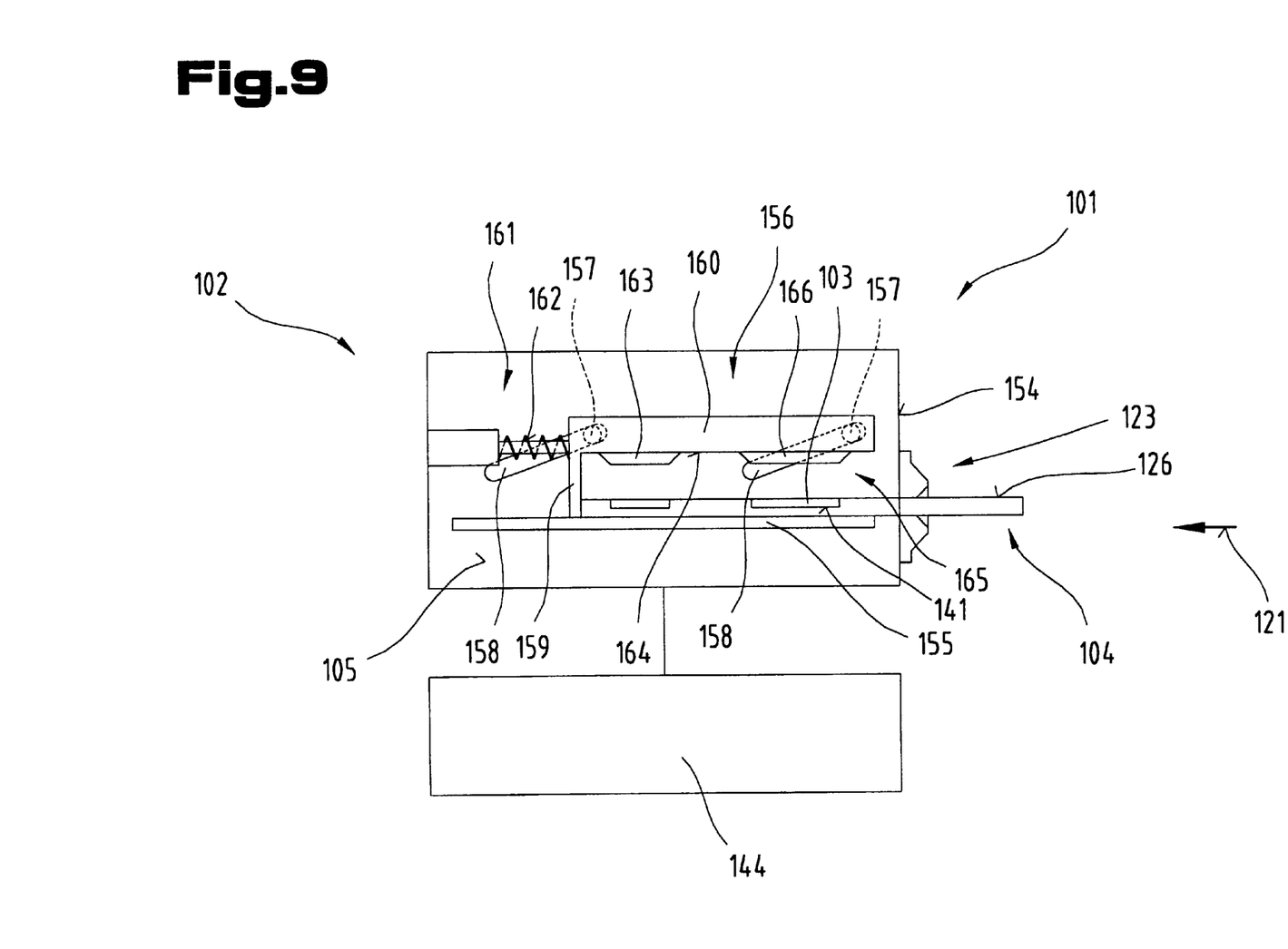
FIG. 9 a simplified, schematic diagram of another embodiment of the device according to the invention.

FIG. 9 is a simplified diagram illustrating another embodiment of the printing device 101. An embodiment of this type provides a compact structure of the printing device 101 whereby the printing device 101 does not require transport devices 106 and drives or drive motors 107.

The printing device 101 is arranged in the housing 105, a feed-in device 123 again being arranged on a front face 154, in other words on the external face. Inside the housing 105, the printing device 101 has a support surface 155 for the information carrier 104.

In order to delete from and print on the information carrier 104 or heat-sensitive layer 103 or add extra data which can be read off from a magnetic strip or a chip of the information carrier 104, the printing device 101 has a carriage device 156 on which the individual components for reading, deleting and printing are arranged. The carriage device 156 is mounted in guide tracks 158 by means of several guide pins 157 enabling the carriage device 156 to be positioned in its rest position at a distance from the support surface 155.

In addition, the carriage device 156 has a catch 159 on the side lying opposite the feed-in device 123. The catch 159 extends from a main housing 160 of the carriage device 156 in a direction towards the support surface 155 so that when the information carrier 104 is inserted, it lies against the catch 159. Also provided in the housing 105 is a positioning device 161, in particular provided in the form of a spring 162. The purpose of the positioning device 161 is to retain the carriage device 156 in its original position or rest position and, when the carriage device 156 is moved out from the rest position, after the information carrier 104 has been removed or is being taken out, to return the carriage device 156 back to its rest position.

The guide tracks 158 are therefore so arranged that they extend at an angle in a direction towards the support surface 155, i.e. when the carriage device 156 slides, the main housing 160 is lowered in a direction towards the information carrier 104, thus being moved to bear on the information carrier 104.

The individual devices for reading and printing to and the devices for deleting from the information carrier 104 are arranged on or in the main housing 160 of the carriage device 156. To this end, if an information carrier 104 is being used as a chip card, a chip contact unit 163 is arranged on a surface 164 of the main housing 160 facing the support surface 155. In addition, the carriage device 156 has a deleting and/or printing device 165 on its surface 164, in particular a 7-segment heating element 166, for deleting and printing characters or graphics onto the heat-sensitive layer 103 of the information carrier 104. The individual contact units, in particular the chip contact unit 163 and the deleting and/or printing device 165, are connected to the control device 144 as described in FIG. 7, so that the individual contact units can be controlled via this control device 144.

To enable the data from the information carrier 104 to be read off via the chip contact unit 163, the user must insert the information carrier 104 into the housing 105 of the printing device 101 via the feed-in device 123. By inserting or rather due to the force exerted when inserting the information carrier 104 in the direction of conveyance—according to arrow 121—onto the catch 159, the catch 159 causes the carriage device 156 to be lowered along the guide tracks 158, due to insertion of the information carrier 104, towards the information carrier 104 until the carriage device 156 has been lowered so far that the carriage device 156 lies against the upper side 126. A retaining device may be provided as a means of retaining the carriage device 156 in its operating position.

Because the individual reading devices and the chip contact unit 163 along with the deleting and/or printing device 165 are mounted on the main housing 160 of the carriage device 156, they are also lowered onto the upper side 126 of the information carrier 104, so that the chip provided on the information carrier 104 can be read and a deleting-printing procedure performed on the heat-sensitive layer 103.

However, care must be taken to ensure that the information carrier 104 is fully inserted in the housing 105 to ensure that a good contact is produced and that control device 144 detects the fact that an information carrier 104 has been inserted in the printing device 101. Depending on the application of the printing device 101, the control device 144 will then read data off from the chip contact unit 163 and printed on the information carrier 104. Once the control device 144 has read off the data from the information carrier 104 and written to it, the deleting and/or printing device 165 is activated by the control device 144.

To this end, the deleting and/or printing device 165 and its heating elements 141 may be arranged in a 7-segment layout or as individual points, enabling the process of deleting from the heat-sensitive layer 103 to be performed in various ways. For example, all the heating elements 141 may be heated to the erasure temperature so that the characters and graphics already printed in the heat-sensitive layer 103 are deleted immediately. However, in order to be able to print any characters or graphics with the same heating elements 141, the relevant individual heating elements 141 of the deleting and/or printing device 165 will have to be heated to a higher temperature so as to reach the requisite printing temperature for the heat-sensitive layer 103 and enabling the deleting and/or printing device 165 to print onto this layer 103.

It is also possible for the deleting and/or printing device 165 to have heating elements 141 arranged in two layers, in other words to have a deleting layer and a printing layer, in which case the heating elements 141 applying the temperature needed for erasure may be of a slightly larger construction than the heating elements 141 used for the printing process. The advantage of providing two layers of heating elements 141 resides in the fact that the differing sizes of the individual heating elements 141 will have the effect of compensating for the mechanical unevenness which occurs as the information carrier 104 is being fed in, thereby enabling a contrast to be produced accordingly on the heat-sensitive layer 103. To operate a printing or deleting process with a system of this type, the relevant layer is heated by the control device 144 to the requisite deleting or heating temperature so that only the deleting layer is heated during the deleting process, after which the printing layer of individual heating elements 141 of the printing layer are heated to the requisite printing temperature for the printing process.

If a user has inserted the information carrier 104 in the printing device 101 and the information carrier 104 is to be used as a card for telephone units, the consumed value can be debited from the chip provided on the information carrier 104 via the chip contact unit 163 and the remaining balance can be printed on the heat-sensitive layer 103 as plain text by means of the 7-segment heating elements 166, in other words it can be printed in plain text by means of the deleting and/or printing device 165. The user will then have the major advantage of always being able to see the current card status on the card or information carrier 104.

Once the user has removed the information carrier 104 from the printing device 101 again, the carriage device 156 is pushed back into the original position or rest position by means of the positioning device 161 so that the printing device 101 is ready for another print-read process.

The advantage of the embodiment described above is that a very compact and simple device can be produced using a device 102 of this type in which both the chip technology and the plain text display can be compressed by means of the heat-sensitive layer 103. Another advantage of an embodiment of this type is that by dispensing with the conveyor units such as the transport devices 106 and the drive motors 107 or stepping motors 109, production costs are reduced and a compact structure can be made, giving an embodiment of the printing device 101 that is very much less prone to faults due to the fact that only a few controllable parts are used.

For the sake of good order, it should be pointed out that in order to provide a clearer understanding of the invention, individual components and units illustrated in the drawings are not shown to scale and are distorted in terms of proportions.

The individual embodiments illustrated in FIGS. 1; 2, 3; 4, 5; 6; 7; 8; 9 may be seen as independent solutions of the invention. The objectives of the invention and the ways in which these are achieved are explained in the detailed descriptions of these figures.

| | |
|---|---|
| 1 | Printing device |
| 2 | Device |
| 3 | Layer |
| 4 | Information carrier |
| 5 | Housing |
| 6 | Drive motor |
| 7 | Transport roller |
| 8 | Transport device |
| 9 | Stepping motor |
| 10 | Drive element |
| 11 | Toothed belt |
| 12 | Drive gear |
| 13 | Surface |
| 14 | Card guide |
| 15 | Arrow |
| 16 | Upper side |
| 17 | Counter-roller |
| 18 | Feed-in device |
| 19 | Lead-in rocker |
| 20 | Cleaning device |
| 21 | Cleaning head |
| 22 | Deleting and/or printing device |
| 23 | Delete head |
| 24 | Write head |
| 25 | Control module |
| 26 | Control module |
| 27 | Heating element |
| 28 | Performance control circuit |
| 29 | Output device |
| 30 | Chip processing station |
| 31 | Data storage element |
| 32 | Computer |
| 33 | Control device |
| 34 | Hand-held device |
| 35 | Sales shelf |
| 36 | Merchandise labelling card |
| 37 | Handle |
| 38 | Battery |
| 39 | Power supply |
| 40 | Device head |
| 41 | Scanner |
| 42 | Reading device |
| 43 | Front face |
| 44 | Orifice |
| 45 | Front face |
| 46 | Barcode |
| 47 | Transmitting and receiving device |
| 48 | Smart card |
| 49 | Substrate |
| 50 | Recess |
| 51 | Surface |

-continued

| | |
|---|---|
| 52 | Film |
| 53 | Upper side |
| 54 | Protective layer |
| 55 | Longitudinal side edge |
| 56 | Marker field |
| 57 | Temperature sensor |
| 58 | Rear side |
| 59 | Pre-heating device |
| 60 | Heating element |
| 61 | Processor |
| 62 | Performance control circuit |
| 63 | Output |
| 64 | Output |
| 65 | Input |
| 101 | Printing device |
| 102 | Device |
| 103 | Layer |
| 104 | Information carrier |
| 105 | Housing |
| 106 | Transport device |
| 107 | Drive motor |
| 108 | Transport roller |
| 109 | Stepping motor |
| 110 | Drive roller |
| 111 | Pressure roller |
| 112 | Layer |
| 113 | Distance |
| 114 | Thickness |
| 115 | Guide device |
| 116 | Support surface |
| 117 | Face |
| 118 | Face |
| 119 | Distance |
| 120 | Guide device |
| 121 | Arrow |
| 122 | External surface |
| 123 | Feed-in device |
| 124 | Lead-in rocker |
| 125 | Cleaning device |
| 126 | Upper side |
| 127 | Rollers |
| 128 | Rollers |
| 129 | Cleaning roller |
| 130 | Layer |
| 131 | Layer |
| 132 | Printing device |
| 133 | Deleting device |
| 134 | Write head |
| 135 | Pressure roller |
| 136 | Roller |
| 137 | Surface |
| 138 | Resistance paste |
| 139 | Layer |
| 140 | Pressure roller |
| 141 | Heating elements |
| 142 | Performance control circuit |
| 143 | Chip card interface |
| 144 | Control device |
| 145 | Computer |
| 146 | Cooling device |
| 147 | Cooling roller |
| 148 | Cooling roller |
| 149 | Layer |
| 150 | Heat energy source |
| 151 | Inner chamber |
| 152 | Lamp |
| 153 | Light beam |
| 154 | Front face |
| 155 | Support surface |
| 156 | Carriage device |
| 157 | Guide pins |
| 158 | Guide tracks |
| 159 | Catch |
| 160 | Main housing |
| 161 | Positioning device |
| 162 | Spring |
| 163 | Chip contact unit |
| 164 | Upper surface |
| 165 | Deleting and/or printing device |
| 166 | 7-segment heating element |

What is claimed is:

1. A device for the thermal application of information to a heat-sensitive layer of an information carrier comprising an electronic data storage element in the form of a processor chip, which comprises
   (a) an input device and an output device formed by guides for the information carrier,
   (b) a deleting device formed by a heatable roller having a flexible surface,
   (c) an energy control circuit for providing energy,
   (d) a printing device arranged downstream of the energy control circuit, and
   (e) a processor for processing and transferring information of the electronic data storage element to the printing device.

2. The device of claim 1, wherein the information is comprised of characters and/or graphics.

3. The device of claim 1, wherein the processor chip is an ID card, a smart card, an access card or a merchandise labeling card.

4. The device of claim 1, wherein the deleting device is arranged adjacent the printing device.

5. The device of claim 1, further comprising a resistance layer on the heatable roller.

6. The device of claim 5, wherein the heatable roller is of a ceramic material.

7. The device of claim 5, further comprising an energy source and spring contacts connecting the resistance layer to the energy source.

8. The device of claim 1, wherein an elastic silicone layer forms the flexible surface of the heatable roller.

9. The device of claim 8, wherein the elastic silicone layer is arranged on a resistance layer.

10. The device of claim 1, further comprising a temperature sensor or a heating element arranged in the heatable roller, the temperature sensor or heating element having an output connected to a control device.

11. The device of claim 1, further comprising a pressure roller arranged oppositely to the heatable roller.

12. The device of claim 1, wherein the heatable roller has an inner chamber, and further comprising a heat energy source arranged in the inner chamber.

13. The device of claim 12, wherein the heat energy source is a lamp.

14. The device of claim 1, further comprising a cooling device consisting of at least one cooling roller, the cooling device being arranged in the device for cooling the heat-sensitive layer.

15. The device of claim 14, wherein the cooling roller is made from a good heat conducting material.

16. The device of claim 15, further comprising a carriage device whereon individual reading, deleting and printing components of the information carrier are arranged, and guide pins mounting the carriage device on the printing device.

17. The device of claim 16, wherein the carriage device has a feed-in device at one side thereof and a main housing, further comprising a catch on a side opposite to the one side, the catch extending from the main housing towards the support surface.

18. The device of claim 17, wherein the printing device has a housing, further comprising guide tracks for the guide pins arranged on the printing device housing for guiding the carriage device, the guide tracks running at an angle towards the support surface.

19. The device of claim 18, wherein the catch causes the carriage device to be lowered along the guide tracks upon insertion of the information carrier.

20. The device of claim 19, wherein the printing device comprises a deleting and writing device arranged on the main housing for deleting from and writing on the heat-sensitive layer.

21. The device of claim 20, wherein the deleting and writing device is formed by a control module and by heating elements of a delete head conductively connected thereto.

22. The device of claim 21, further comprising an energy source applying energy to the heating elements as a permanent base load.

23. The device of claim 21, further comprising a control device for applying different voltages to the heating elements.

24. The device of claim 23, further comprising a computer conductively connected to the control device, the computer having an input terminal for operating purposes.

25. The device of claim 24, wherein the computer comprises control and operating software.

26. The device of claim 20, wherein the deleting and writing device is formed by a control module and by heating elements of a write head conductively connected thereto.

27. The device of claim 26, wherein the heating elements form groups, the heating elements of each group being arranged in a dot matrix pattern.

28. The device of claim 26, further comprising a temperature sensor arranged in the write head.

29. The device of claim 26, further comprising a resistance measuring device measuring the internal resistance of the heating elements of at least one of the heads.

30. The device of claim 26, wherein the delete head is formed by a strip-shaped heating element provided with a temperature sensor integrated therein.

31. The device of claim 26, further comprising a preheating heating device arranged upstream of the delete head in a direction of conveyance of the information carrier.

32. The device of claim 20, further comprising a control switch conductively connecting the deleting and writing device to heating elements of a delete and write head.

33. The device of claim 32, wherein the heating elements of the delete head are arranged immediately adjacent the heating elements of the write head, and the heating elements are thermally insulated.

34. The device of claim 33, wherein the heating elements of the write head are thermally insulated from one another, further comprising an energy source for applying energy individually to each one of the heating elements.

35. The device of claim 32, wherein the delete and write heads have a base surface corresponding to a marker field of the information carrier.

36. The device of claim 1, wherein the printing device comprises a support surface for the information carrier.

37. The device of claim 36, wherein a carriage device whereon individual reading, deleting and printing components of the information carrier are arranged is positioned at a distance from the support surface in its rest position.

38. The device of claim 36, wherein a carriage device whereon individual reading, deleting and printing components of the information carrier are arranged lies on the information carrier in the operating position.

* * * * *